United States Patent
Torres et al.

(10) Patent No.: US 10,305,800 B2
(45) Date of Patent: May 28, 2019

(54) PREFERENTIAL SELECTION OF IP PROTOCOL VERSION WITH DOMAIN NAME MATCHING ON PROXY SERVERS

(71) Applicant: Hughes Network Systems, LLC, Germantown, MD (US)

(72) Inventors: Robert James Torres, New Market, MD (US); Nagesh Javali, Germantown, MD (US); Venkatasubramaniam Ganesan, Germantown, MD (US); Ganeshan Ramachandran, Frederick, MD (US); Mark Petronic, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 607 days.

(21) Appl. No.: 14/687,695

(22) Filed: Apr. 15, 2015

(65) Prior Publication Data

US 2016/0308818 A1 Oct. 20, 2016

(51) Int. Cl.
*G06F 15/173* (2006.01)
*H04L 12/749* (2013.01)
(Continued)

(52) U.S. Cl.
CPC ......... *H04L 45/741* (2013.01); *H04B 7/2126* (2013.01); *H04L 41/12* (2013.01);
(Continued)

(58) Field of Classification Search
CPC ............... H04L 45/741; H04L 65/1016; H04L 65/1006; H04L 29/06; H04L 61/251; H04L 65/6086; H04L 61/1511; H04L 61/6009; H04L 41/12; H04L 45/02; H04W 80/045; H04B 7/2126
(Continued)

(56) References Cited

U.S. PATENT DOCUMENTS 9,300,623 B1 * 3/2016 Earl .................... H04L 61/1511
2004/0258053 A1 * 12/2004 Toporek ............... H04B 7/2126
370/352
(Continued)

FOREIGN PATENT DOCUMENTS

EP 2779588 9/2014

OTHER PUBLICATIONS

International Search Report and the Written Opinion for International App No. PCT/US2016/027599, dated Jun. 29, 2016, Authorized Officer: Pettersson, Hans.

*Primary Examiner* — Kyung H Shin
(74) *Attorney, Agent, or Firm* — Sheppard Mullin Richter & Hampton LLP

(57) ABSTRACT

Systems and methods for the preferential selection or blocking of Internet Protocol (IP) version addresses, e.g., IPv4 and IPv6 addresses, are provided. During a process where address or domain name resolution is performed, an entity may access a domain bypass list to ascertain whether or not to proceed with requests utilizing an IPv4 address, an IPv6 address, or neither. Such a list may be dynamically or manually created and/or updated such that known issues associated with the use of a particular type of IP version address can be avoided for subsequent resolution requests to access network resources such as web pages, DNS entries, etc.

25 Claims, 7 Drawing Sheets

(51) Int. Cl.
*H04L 12/24* (2006.01)
*H04B 7/212* (2006.01)
*H04L 29/12* (2006.01)
*H04L 29/08* (2006.01)

(52) U.S. Cl.
CPC ...... *H04L 61/1511* (2013.01); *H04L 67/2842* (2013.01); *H04L 61/6013* (2013.01); *H04L 61/6059* (2013.01); *H04L 61/6068* (2013.01)

(58) Field of Classification Search
USPC .................. 709/223, 245; 370/389, 352
See application file for complete search history.

(56) References Cited

U.S. PATENT DOCUMENTS

| | | | |
|---|---|---|---|
| 2011/0182293 A1* | 7/2011 | Seo | H04L 41/12 370/392 |
| 2012/0082158 A1* | 4/2012 | Reddy | H04W 80/045 370/389 |
| 2012/0303808 A1 | 11/2012 | Xie | |
| 2013/0205035 A1 | 8/2013 | Chen | |
| 2014/0258491 A1* | 9/2014 | Forristal | H04L 45/741 709/223 |

* cited by examiner

PREFERENTIAL SELECTION OF IP PROTOCOL VERSION WITH DOMAIN NAME MATCHING ON PROXY SERVERS

TECHNICAL FIELD

The present disclosure relates generally to communications networks. More particularly, some embodiments of the present disclosure are directed toward systems and methods for selecting a preferred Internet Protocol (IP) Version address.

BACKGROUND

The robustness of the global Internet stems in part from the naming system that is in place for one machine to communicate with another machine. The naming system that has been adopted to allow for such communications is known as the Domain Name System or Domain Name Service (DNS), which permits machines to be identified by "domain names" (i.e., host names). Domain names can provide a more readily usable address naming scheme for human recognition, for example, "hns.com." Applications, such as e-mail or a web browser, utilize domain names in their communication with remote machines and other processes. This communication involves the translation or mapping of domain names to addresses, such as IP addresses, to reach specific machines. In essence, DNS provides a mapping of domain names to IP addresses. The DNS is a distributed database that stores the domain name, IP address, as well as other information about hosts. The distributed database is implemented by storing various portions of the database across multiple servers in a hierarchical structure—these servers are termed "DNS servers." Thus, the host associated with the application submits queries to a DNS server for a specific IP address of a particular destination machine.

Proxy servers, which can be used as DNS servers, are widely used by Internet Service Providers (ISPs) for performance improvement as well for enhanced security. A proxy server typically functions by intercepting layer-4 and/or application layer traffic to/from an end-user device and then performs specialized operations such as serving cached content, filtering malicious content, using the most optimal Quality of Service (QoS) based on the content type etc. While performing these functions, the proxy server acts on behalf of the end-user device and therefore the splits the traffic path into two segments: traffic between the end-user device and the Proxy server and the traffic between Proxy server and the origin server.

FIG. 1 illustrates a simplified example of the use of Proxy server in a network. In the illustrated example, proxy server 134 can be implemented as a computing system or an application that can be configured to act as an intermediary between the end-user device 132 and an Internet server (e.g., an original server 138), which can be accessed via the Internet 136. Proxy servers such as proxy server 134 typically intermediate to handle requests and traffic 110 for services or resources from one or more end-user devices 132. In operation, the end-user device 132 connects to the proxy server and requests service from another server such as, for example, original server 138. It should be noted however, that end-user device 132 need not be aware of the presence of proxy server 134. The service can include, for example, a file, a connection, a webpage, or other resource available from origin server 138. The proxy server receives the request and communicates with original server 138 as a proxy for the end-user. Although one end-user device 132 and one original server 138 are illustrated, proxy servers 134 can typically handle traffic among multiple end-user devices 132 and original servers 138.

The traffic 112, 114 between proxy server 134 and original server 138, as seen by original server 138 or any intermediate devices, originates and terminates on proxy server 134. The source IP address of originating traffic 112 is that of proxy server 134 and not that of the end-user device on whose behalf the proxy server is requesting the content.

SUMMARY

Systems and methods are provided for the preferential selection of an IP version. Particularly, various embodiments of the systems and methods disclosed herein can determine whether to resolve DNS requests/queries to IPv4 and/or IPv6 IP addresses or neither.

In accordance with one embodiment, a method comprises a proxy server receiving a DNS request for a domain, the proxy server determining whether the domain matches an entry stored within a domain bypass list. Furthermore, the method comprises: upon a determination that the domain does not match at least one entry stored within the domain bypass list, looking up the domain in a cache of the proxy server; and upon a determination that the domain does match at least one entry stored within the domain bypass list, determining whether to allow or block one or more types of traffic based upon a preferentially selected IP version.

In accordance with another embodiment, a very small aperture terminal (VSAT) of a satellite network, comprises a domain name service (DNS) proxy server for receiving a DNS request for a domain from a requesting device, and a DNS proxy server cache, wherein the DNS proxy server determines whether the domain matches an entry stored within a domain bypass list. Upon a determination that the domain does not match at least one entry stored within the domain bypass list, looking up the domain in the DNS proxy server cache. Upon a determination that the domain does match at least one entry stored within the domain bypass list, determining whether to allow or block one or more types of traffic based upon a preferentially selected Internet Protocol (IP) version.

In accordance with yet another embodiment, a satellite gateway comprises a web acceleration server for receiving a request from a requesting device, and a cache. The web acceleration server determines whether a domain matches an entry stored within a domain bypass list in relation to the request. Upon a determination that the domain does not match at least one entry stored within the domain bypass list, the domain is looked up in the cache. Upon a determination that the domain does match at least one entry stored within the domain bypass list, a determination is made whether to allow or block one or more types of traffic based upon a preferentially selected Internet Protocol (IP) version.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide mechanisms for the preferential selection or blocking of IP version addresses, e.g., IPv4 and IPv6 addresses. For example, during a DNS lookup, proxy server connection setup, or other process where address resolution is performed, an entity may access a domain bypass list to ascertain whether or not to proceed by responding to requests with an IPv4 address, an IPv6 address, both, or neither. Such a list may be dynamically or manually created and/or updated such that known issues associated with the use of a particular type of IP version address can be avoided for subsequent DNS requests. This preferential selection can also be utilized in the context of IPv4/IPv6 socket connections through which one or more web objects may be fetched. Further still, various embodiments may support different mechanisms that can be used to match received hostnames with domain names present in the dynamic bypass list to achieve varying levels of performance.

Figure 2A:
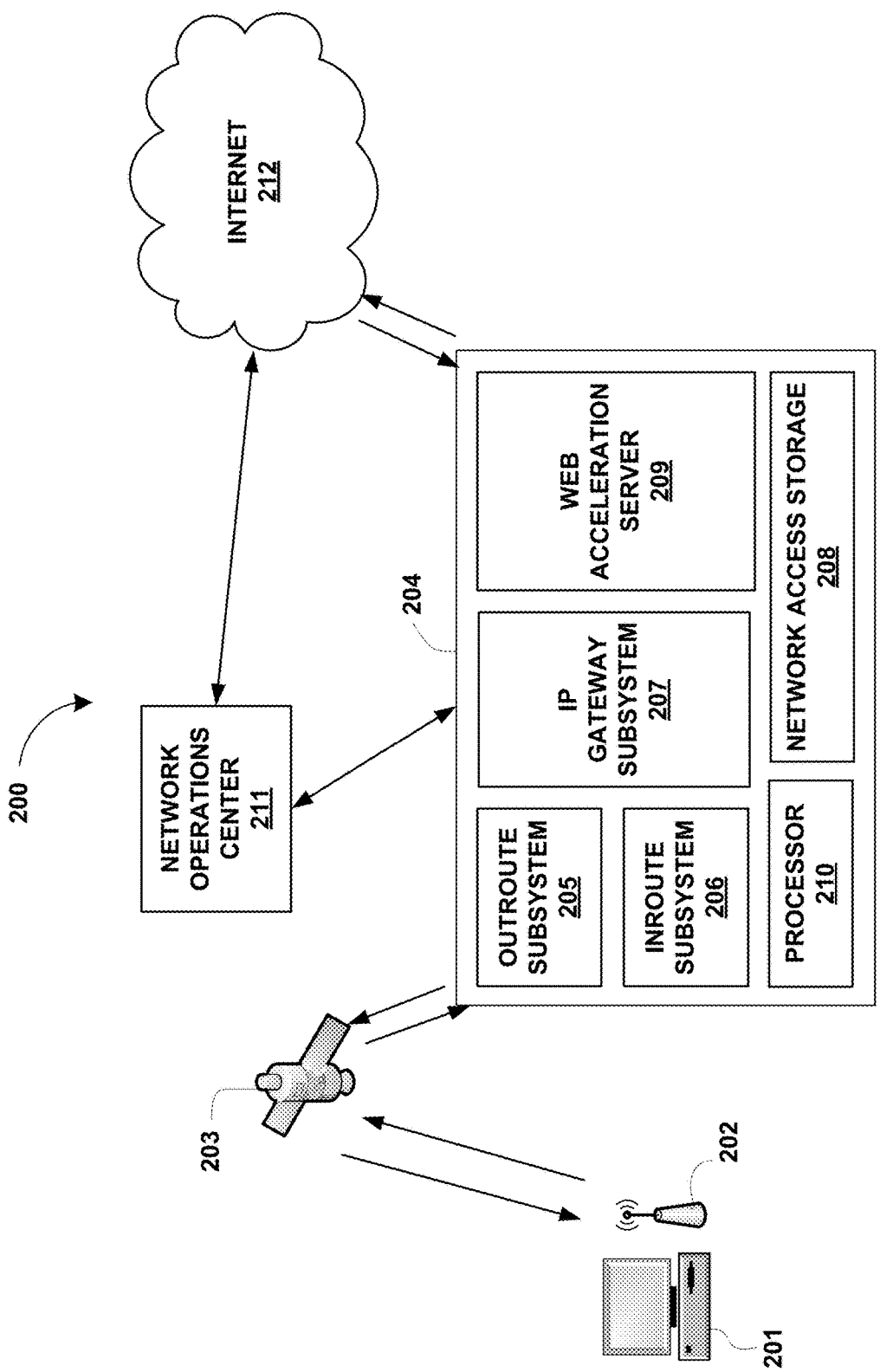
FIG. 2A illustrates an example system in which various embodiments of the technology disclosed herein may be implemented.

FIG. 2A illustrates an example network 200 in which various embodiments may be implemented. It should be noted that although network 200 is illustrated and described herein as a satellite broadband network, the technology disclosed herein can be implemented on or for any network independent of the communication protocol used, like cable or fiber-optic networks, for example. In the example illustrated in FIG. 2A, a user device or customer premises equipment (CPE) 201 can connect to network 200 through a user terminal 202. User device 201 may include any web-enabled device, including personal computers, laptops, televisions, gaming consoles, tablets, web-enabled cell phones, smartphones, web-enabled appliances, PDAs, or any other web-enabled device. User device 201 may be connected to the user terminal 202 directly through a wired connection utilizing Universal Serial Bus (USB), firewire, local area network (LAN) or any other communication medium. User device 201 may also be connected to the user terminal 202 through a router, either directly or wirelessly through a wireless-capable router.

The user terminal 202 may further be connected to a gateway 204 through a satellite 203. Although FIG. 2A illustrates a satellite broadband network, other embodiments of the technology disclosed herein may include a terrestrial communication link between the user terminal 202 and the gateway 204, such as a cable connection or fiber-optic cabling. More than one user terminal 202 may connect to the gateway 204 through the satellite 203 to obtain Internet access over the network 200. In other embodiments, the network 200 may comprise an intranet, data network, or other type of communication infrastructure where requests are transmitted between multiple pieces of equipment.

As further illustrated in FIG. 2A, the gateway 204 connects the user terminal 202 to the Internet 212. The gateway 204 may include several subsystems, including an outroute subsystem 205 for sending information to the satellite 203, an inroute subsystem 206 for receiving information from the satellite 203, and an IP gateway subsystem 207 for communicating with the Internet and executing website retrieval requests from one or more (end) user devices 201 connected to the gateway 204 through one or more user terminals 202. The gateway 204 may also include a processor 210 and a network access storage (NAS) 208. The gateway 204 connects to the Internet through an interconnect carrier, which is a mutual connection between the network 200 and other networks making up the Internet. The interconnection may be operated by the ISP, or by another common carrier with whom the ISP has a contract to provide connection of network 200 to other third party networks making up the Internet. In other embodiments, the gateway 204 may include additional components or less components than those outlined above. Moreover, the individual functionalities of the components can be combined or separated out in alternative embodiments.

The gateway 204 in the illustrated example is also connected to a Network Operations Center (NOC) 211. The NOC 211 can be used by an ISP to monitor and control one or more aspects of the ISP network 200.

In addition to the above-described components, in some embodiments, the gateway 204 may include a web acceleration server (WAS) 209. WAS 209 may act as a proxy server within the gateway 204 to reduce access times for website retrieval requests. There are many different methods by which a proxy server, like WAS 209 may reduce access time, including but not limited to the following: caching recently retrieved documents and objects; compressing documents to smaller sizes; filtering out objects, such as ads, instead of retrieving and sending the objects to the end user or user device 201; and prefetching object URLs that are common to a domain address so that those objects do not need to be retrieved for each unique request to that domain. WAS 209 may also be an external component connected to gateway 209 to provide web acceleration, as opposed to an internal component.

Figure 1:
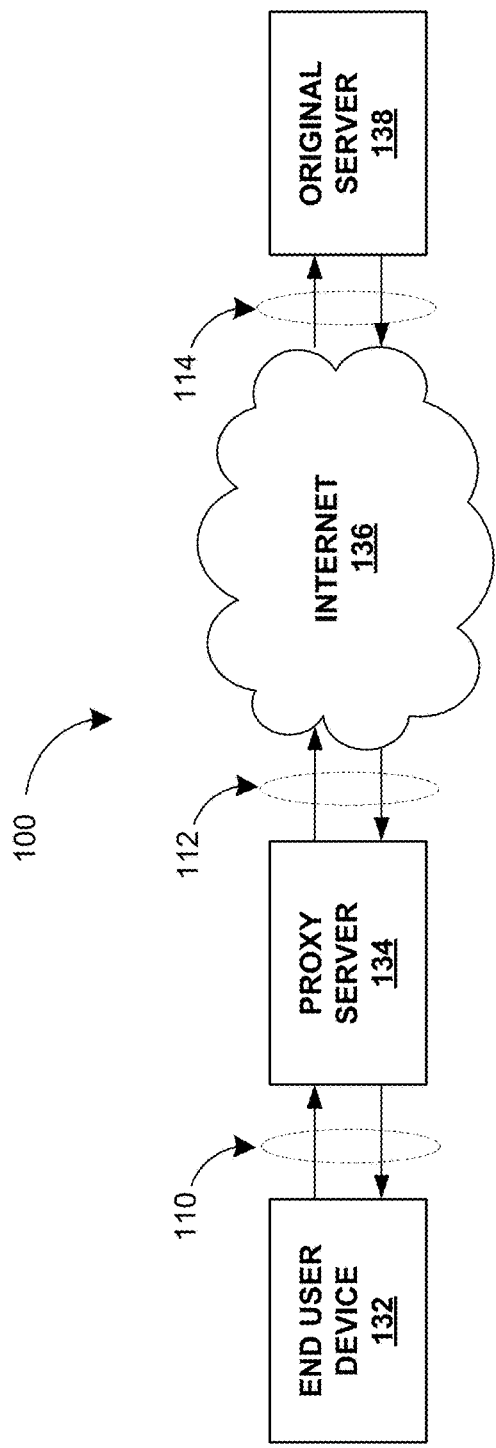
FIG. 1 illustrates a simplified example of the use of proxy server in a network.

As alluded to previously, a proxy architecture can be utilized to support, e.g., DNS pre-fetch caching. For example, web pages may be formatted according to the Hypertext Markup Language (HTML) standard which provides for the display of high-quality text (including control over the location, size, color and font for the text), the display of graphics within the page and the "linking" from one page to another, possibly stored on a different web server, e.g., origin server 138 of FIG. 1. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

A host, such as user device 201 may have implemented thereon, a web browser (e.g., MICROSOFT Internet Explorer) to access web pages that are resident on a web server, where collectively, the web pages and web server can denote a "web site." A proxy server, such as WAS 209, may be provided to increase system performance by supporting such functions as pre-fetching content.

In operation, a user can enter or specify a URL to the web browser of the user device 201, which in turn requests a URL from a web server. User device 201 may need to resolve an IP address corresponding to a domain name of the URL from a DNS server. Such a domain name lookup may involve traversing network 200, until the web server returns an HTML page, which contains numerous embedded objects (i.e., web content), to the web browser. Upon receiving the HTML page, the web browser parses the page to retrieve each embedded object. The retrieval process can involve the establishment of separate communication sessions (e.g., TCP (Transmission Control Protocol) connections) to the web server. That is, after an embedded object is received, the TCP connection is torn down and another TCP session is established for the next object. Alternatively, a TCP connection may be re-used to fetch multiple objects. Given the richness of the content of web pages, it is not uncommon for a web page to possess over 30 embedded objects; thereby consuming a substantial amount of network resources, but more significantly, introducing delay to the user. To minimize such delay, webpage objects or content, such as pictures, can be pre-fetched before an end user of user device 201 has made a request for subsequent objects using a proxy server, such as WAS 209 of FIG. 2A. In this way, objects can be ready before the user requests it, where pre-fetched content may be sent via satellite, e.g., satellite 203, to a user terminal, e.g., VSAT 202, for storage within a VSAT cache.

In particular, and as previously mentioned, the DNS is a hierarchical naming system standardized by the Internet Engineering Task Force (IETF) that, among other things, allows users and user devices (e.g., applications on computers, smartphones, tablets, etc.) to identify Internet hosts using a mnemonic domain name rather than an IP address. Use of domain names simplify Internet access as users and programmers may more easily remember and enter the mnemonic domain name than the IP address numeric sequence. For example, a web browser may transparently use the domain name resolution service of a DNS resolver within a user device, e.g., user device 201, which in turn may contact an available DNS server to request the host IP address for a given domain name. That is, "www.facebook.com" may be utilized to identify a Facebook®. host, rather than "ddd.ddd.ddd.ddd" (e.g., type "A" DNS request) for a host IP version four (IPv4) address, or "xxxx.xxxx.xxxx.xxxx.xxxx.xxxx.xxxx.xxxx" (e.g., type "AAAA" DNS request) for a host IPv6 address. Another record type of interest is an alias resource record type, sometimes designated as type "CNAME." The domain name aliases permit naming indirection, in which a first domain name (the alias) resource record points to a second domain name resource record, and so on, until the final domain name resource record is reached, which may be pointing to the host IP address. A DNS server that supports recursive DNS queries may return, in a DNS response, a chain of resource records from the requested (alias) domain name to the final domain name and host IP address. A DNS server that may not support recursive DNS queries may return only the top (alias) record pointing to a next domain name, and the DNS client may have to follow the chain by making successive requests.

Some network (e.g., satellite) systems optimize web browsing response time by parsing to identify embedded domain names and objects of a requested top level web page to be sent by a satellite gateway, e.g., gateway 204, pre-fetching and sending those embedded domain name resolutions and objects to be cached in the VSAT via WAS 209, and supplying those domain name resolutions and objects from the cache as they are requested by the user web browser. The response time is optimized because due to pre-fetching and pushing of the response to a VSAT cache resulting in the response already being stored in the VSAT cache.

Although the use of proxies can be beneficial, it also poses challenges under certain scenarios, such as the following. For example, IP address issues can arise with an Internet/Intranet server when the Internet/Intranet server is misconfigured or when a DNS server provides a particular type of IP address (e.g., IPv4 or IPv6) for the Internet/Intranet server that the Internet/Intranet server doesn't actually support. In other words, the Internet/Intranet server cannot be accessed using the advertised IP address. This can occur when, e.g., a rollout plan for IPv6 (to replace IPv4) places an IPv6 AAAA in a DNS response prior to a server/network supporting the IPv6 addressing scheme. That is, DNS provides an IPv6 address (AAAA record) for a web server when that web server doesn't actually support IPv6. Another situation in which IP address issues may arise can occur when a server/network is not properly configured to listen for IPv6 addressing on all ports on which a server provides services. That is, the server may be configured for IPv6 only for HTTP traffic but not Hypertext Transfer Protocol Secure (HTTPS) traffic. Further still, "sun-setting" IPv4 support on Internet/Intranet servers can often result in a similar issue, where a DNS server provides both IPv4 and IPv6 address, but the server may no longer support IPv4 addressing.

Another manner in which the use of a proxy can be detrimental is when the Internet/Intranet path from an ISP or Gateway is broken. This can be a temporary problem due to ISP or Gateway issues where, if IPv6 connectivity is broken at the ISP or gateway, yet the client is still provided with an IPv6 address to access the Internet/Intranet resource. Still another scenario where problems might arise occurs when IP routing is broken at an enterprise user location. For example, an enterprise user may have an un-routable IP address (due to incorrect IP address setup or software bugs in the routers/switches etc.) One cause may be the incorrect setup of IPv6, while another cause may be legacy/old router firmware with bugs such that an IPv6 address on the user device cannot route to/from the CPE (with DNS Proxy Server capability). Still other situations in which problems may arise involve rogue websites (with malware, virus etc.) hogging resources on proxy servers or CPE with DNS proxy server capabilities Thus, various embodiments can provide for an improved user experience by preferential selection of the IP version that is known to work for a server, while rejecting/discarding the IP version that is known to have issues which impacts the user experience. Moreover, there is a smooth transition of end users to IPv6 when IPv6 deployment on, e.g., some Internet servers is broken, and end users can have a better user experience when IPv4 and/or IPv6 on an Internet server is broken. Further still, resource utilization on a proxy server and CPE with DNS proxy server capability can be controlled.

As utilized herein, a proxy server can refer to a server that acts as an intermediary for requests from clients seeking resources from other servers. A DNS proxy server can refer to a server that takes DNS queries from a network (generally local) and forwards them to an Internet Domain Name Server. It may also cache DNS records. A caching proxy server can accelerate service requests by proactively retrieving content from an original server or retrieving content saved from a previous request made by the same client or even other clients. A web proxy server is a server that can act as an intermediary that forwards, e.g., HTTP requests to an actual web server to retrieve one or more objects.

In order to implement preferential selection of IPv4 or IPv6 or the blocking of both IPv4 and IPv6, a list of domain names can be used at a device (such as a web proxy server, a caching proxy server, a DNS proxy server, etc.). This list is referred to as "domain bypass list." Depending on the device, this domain bypass list can be referenced (looked up) at various stages of connection establishment, such as during DNS lookup in DNS proxy servers, during connection setup in a web proxy server, etc. to achieve selective preference of IP version. It should be noted that more than one domain bypass list may be utilized. For example, each of a plurality of domain bypass lists may be used sequentially accordance to some predefined sequence, where the domain bypass lists may be logically organized, e.g., by grouping the same top-level domains, such as ".com" in a first domain bypass list, ".edu" in a second domain bypass list, etc.

Table 1 below is an example of such a domain bypass list. Table 1 illustrates that for the domain name matching ".nikeplus.com," IPv4 addresses are to be blocked, while IPv6 addresses are to be used. For the domain name matching ".sports.nikeplus.com," the converse is true, i.e., IPv4 is the preferred IP version while IPv6 is blocked. For the domain name matching "virus.com," access (using either IPv4 or IPv6 addresses) is blocked. Thus, when the domain bypass list is accessed, e.g., prior to DNS resolution of a domain name, an IP address utilizing the preferred IP version can be determined. It should be noted that when asking for the IP address of a domain name, the IP version is specified, where the syntax of a DNS request can specify an A (single-A) to retrieve an IPv4 IP address or an AAAA (quad-A) to retrieve an IPv6 IP address.

TABLE 1

| Rule # | Domain Name | IPv4 Block Flag | IPv6 Block Flag |
|---|---|---|---|
| 1 | .nikeplus.com | block | allow |
| 2 | .sports.nikeplus.com | allow | block |
| 3 | virus.com | block | block |

In accordance with one embodiment, a DNS proxy server can be implemented within the VSAT for, e.g., speeding up DNS resolutions. In this embodiment, a DNS query need not traverse a WAS (for traffic that does not pass through the WAS), e.g., secure service layer messaging, passwords, etc. In particular, a VSAT may be configured with a domain bypass list. Whenever a DNS request is received at the VSAT from a user, the DNS proxy server implemented within the VSAT looks up the domain bypass list to determine if the domain name that is the subject of the DNS request is associated with any instructions to block one or both types of IP version (IPv4 and IPv6) addresses or indicating a preference for an IP version. This can be performed prior to accessing its own DNS cache. In other words, the DNS proxy server whether to: allow IPv6 and block IPv4; allow IPv4 and block IPv6; or allow none (i.e., block both IPv4 and IPv6). The DNS proxy server intercepts all DNS requests from the end host and pre-process based on the domain bypass list. This can include DNS requests addressed to the DNS proxy server itself, as well as DNS requests addressed to any external DNS server (such as 8.8.8.8).

Figure 2B:
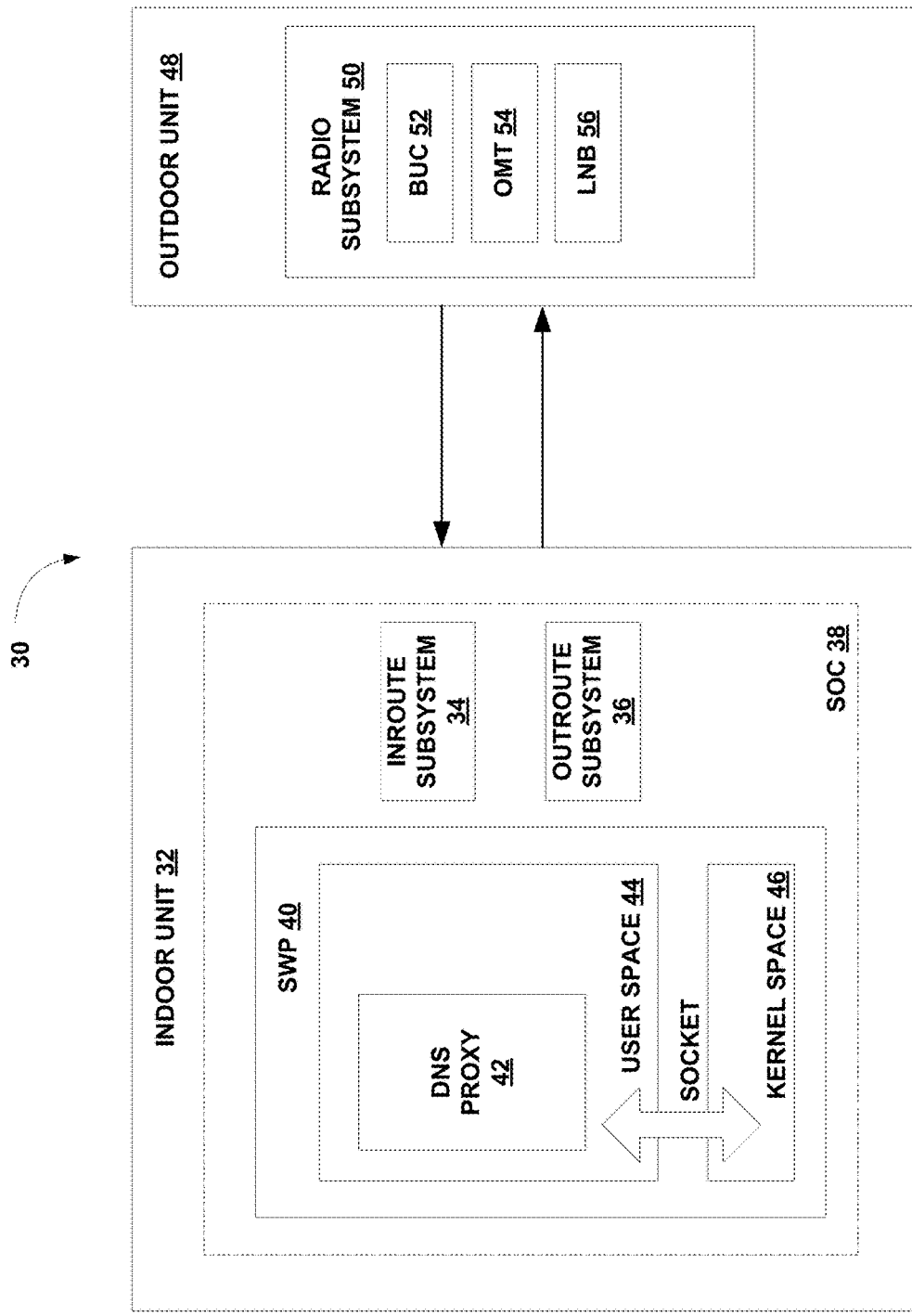
FIG. 2B illustrates an example Very Small Aperture Terminal (VSAT) in which various embodiments of the technology disclosed herein may be implemented.

FIG. 2B is a block diagram illustrating an example VSAT in which various embodiments of the technology disclosed herein may be implemented. As illustrated, VSAT 30 comprises an IDU 32 and an ODU 48. ODU 48 may include an RF radio subsystem 50 that can comprise a block up converter (BUC) 52, orthomode transducer (OMT) 54, a low-noise block (LNB) downconverter 56, and an antenna dish (not shown). BUC 52 may be used in the transmission of satellite inroute signals by frequency upconverting a signal received from transmit/outroute subsystem 36 of IDU 32. The upconverted signal may be sent through a horn to the antenna dish, which focuses the signal into a narrow beam for transmission.

LNB 56 may be configured to receive the outroute signal collected by the antenna dish amplify it, and down-convert the band of received frequencies. The down-converted signal is then transmitted to IDU 32 for processing at the software processing module (SWP) 40. OMT 54 may orthogonally polarize the receive and transmit signals, thereby preventing interference and protecting LNB 56 from burnout by the power of the output signal generated by BUC 52.

In various embodiments, IDU 32 may be a set-top box or satellite modem embodied at least in part as a system on a chip (SOC) 38 including a receive/inroute subsystem 34 and transmit/outroute subsystem 36. Inroute subsystem 34 receives down-converted outroute signals from LNB 56 via a receive cable (e.g., coaxial cable), and may perform functions such as signal decryption and decoding to extract information (e.g., data, voice, video) from the received signals. The extracted information may then be used by a user of VSAT 30 (e.g., for Internet or Satellite TV).

Outroute subsystem 36 may receive information from a user's equipment (not shown) or from the set-top box itself, and it may modulate a reference signal in accordance with this information to produce a modulated information signal. The modulated information signal may then be transmitted to ODU 48 over a transmit cable (e.g., a coaxial cable) for upconversion by BUC 52 and transmission by the antenna dish. The transmitted signal may carry any suitable information, such as, for example, data, voice, and video information. In one embodiment, outroute subsystem may supply ODU 38 with a DC power signal, a carrier on/off signal, or both. Either or both of these signals may be, in accordance with another embodiment, multiplexed with the modulated information signal and transferred to ODU 38 as a single signal via a single cable.

As alluded to above, a DNS proxy server can be implemented within a VSAT such as VSAT 30 for, e.g., speeding up DNS resolutions. FIG. 2B illustrates SWP 40 on which an operating system may be implemented and executed as having a virtual memory that can be segregated into a user space 44 and a kernel space 46, communication therebetween being achieved via socket based communications. A DNS proxy may be implemented in user space 44 of SWP 40.

Figure 3:
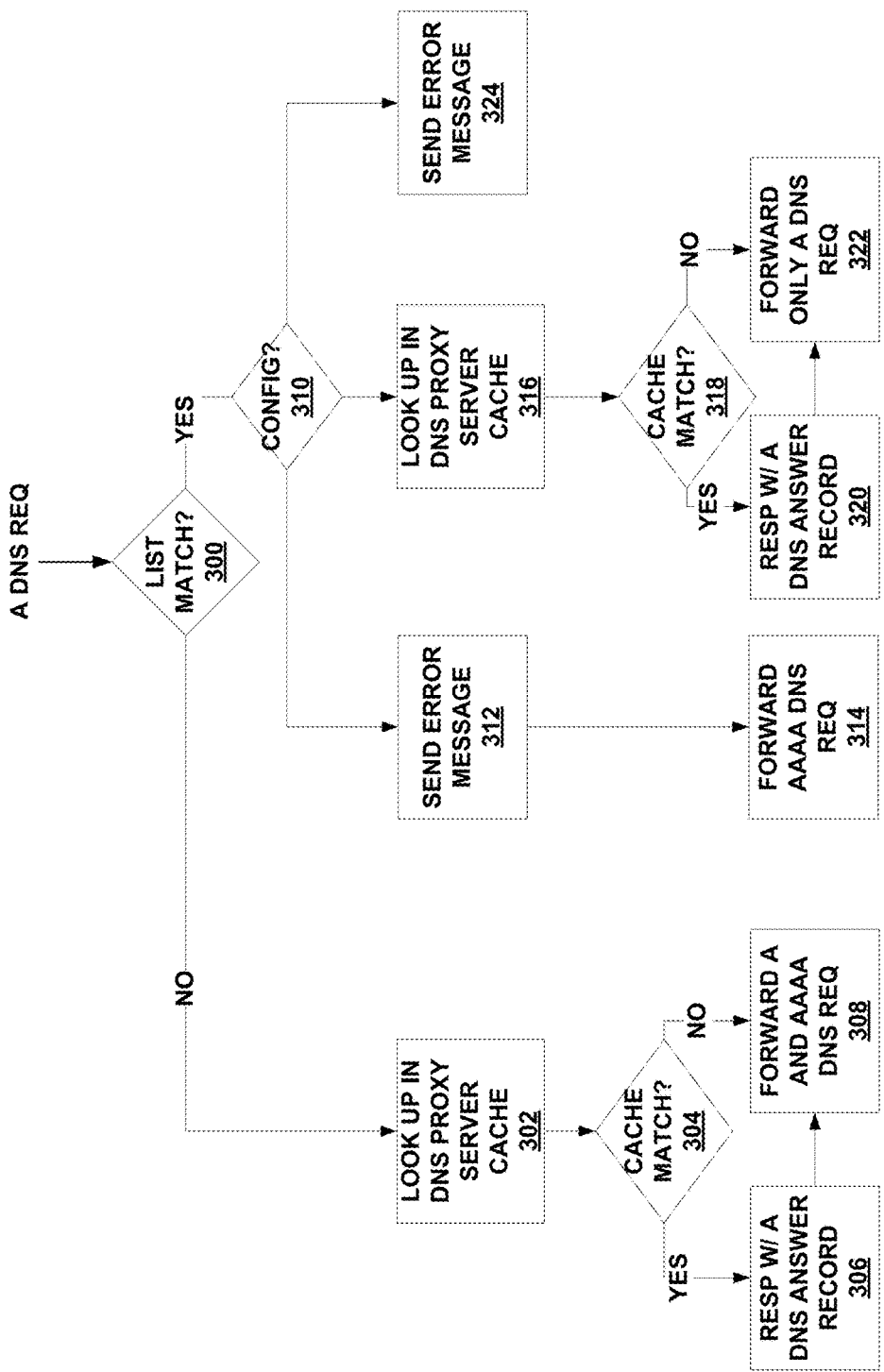
FIG. 3 is an operational flow chart illustrating various processes which can be performed for preferential selection of IP version in accordance with one embodiment of the technology disclosed herein.

FIG. 3 is an operational flow chart illustrating example processes that may be performed to achieve preferential IP version selection in accordance with one embodiment. As illustrated in FIG. 3, upon receiving a Single-A DNS request, at operation 300, a determination is made whether the queried domain name matches a domain name in the domain bypass list. If no match in the domain bypass list is found, the DNS proxy server may access its cache at operation 302. It is determined whether a match exists at operation 304. If a match in the DNS proxy server cache exists, response is transmitted to the user device/localhost with a DNS answer record at operation 306. For example, and referring back to the www.facebook.com example, a response may be "www.facebook.com IN A 192.168.40.100." If at operation 304, no match can be found, both a single-A and a quad-A DNS request can be forwarded to the appropriate DNS server.

If at operation 300, a match to a domain name entry in the domain bypass list is found, the configuration/rules applicable to that domain name entry are determined at operation 310. If it is determined that IPv4 traffic is to be blocked while IPv6 traffic is to be allowed, the DNS proxy server responds to the DNS request with an error message indicating that the DNS request has been refused at operation 312. For example, a DNS Response Code, RCODE=5, can be sent which indicates that the name server refuses to perform the specified operation for policy reasons. Additionally, at operation 314, the DNS proxy server can forward a Quad-A DNS request for the same domain to the appropriate DNS server. That is, if DNS request from the local host is addressed to a DNS proxy server, then the DNS proxy server forwards the DNS request to the DNS Server that is preconfigured. If the DNS request from the local host is addressed to an external DNS server, the DNS proxy server forwards the DNS request to the specified external DNS Server.

If, at operation 310, the determined configuration instructs that IPv6 traffic is to be blocked, while IPv4 traffic is to be allowed, the DNS proxy server attempts to resolve the DNS request based on its DNS cache at operation 316. If there is a match within the DNS proxy server cache at operation 318, the CPE immediately returns a Single-A DNS response message with the IPv4 DNS record at operation 320 to the user device/localhost. If there is no match at operation 318, to ensure that the DNS proxy server cache is up-to-date, the DNS proxy server also forwards a Single-A DNS request to the appropriate server (e.g., external DNS Server or DNS Server that is preconfigured) at operation 322.

In the event that the configuration determined at operation 310 by looking at the domain bypass list instructs that both IPv4 and IPv6 are to be blocked (e.g., in the event that it is known that the domain is associated with a virus, malware, or some other issue), an error message is sent at operation 324 indicating the DNS request has been refused. Again, a DNS response code, RCODE=5, can be sent which indicates that the name server refuses to perform the specified operation for policy reasons. Moreover, the DNS proxy server does not forward a Quad-A DNS request for that domain name. This ensures that the DNS proxy server resources are not consumed upon blocking a domain (e.g., to block virus-like activity on web sites).

Figure 4:
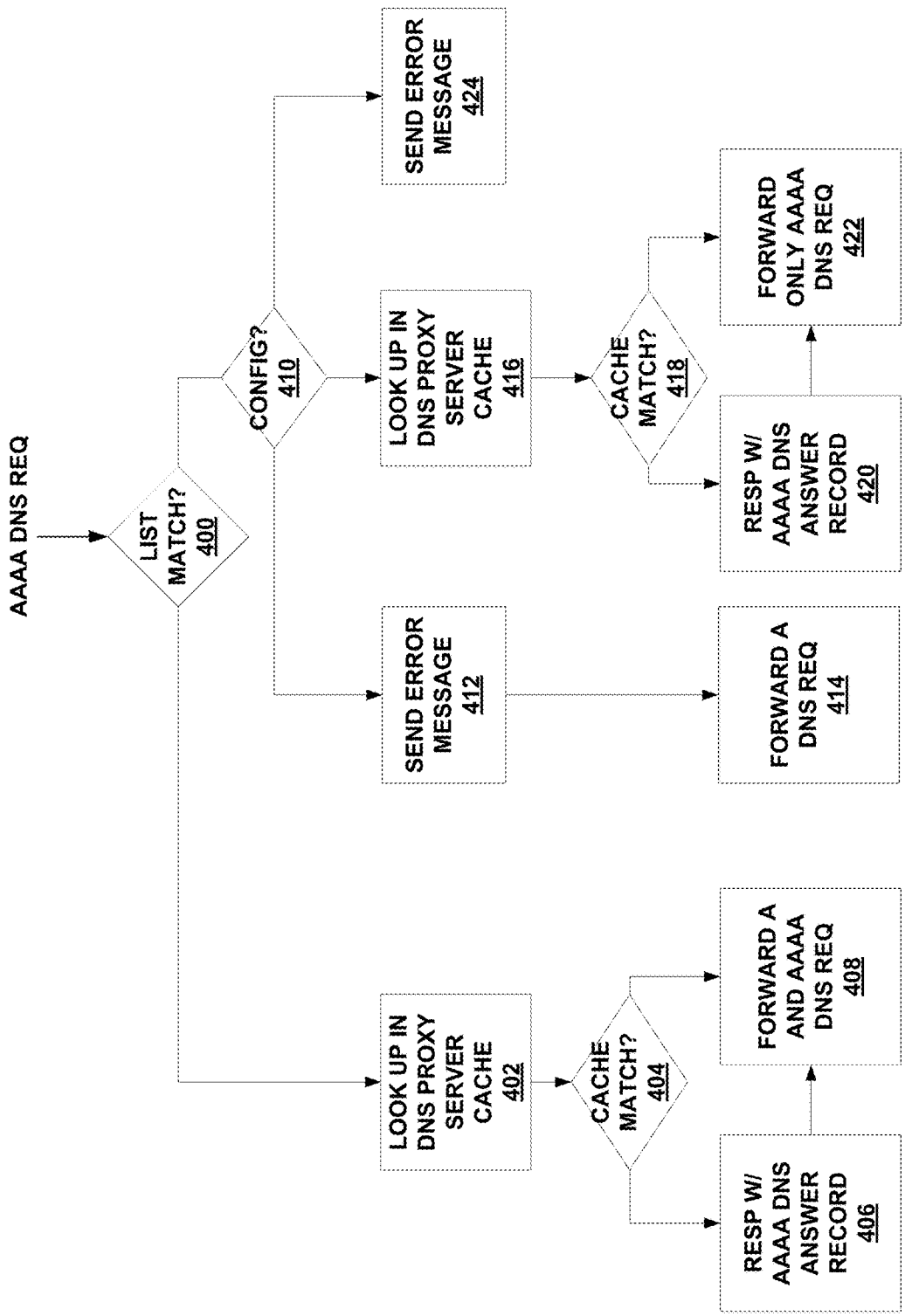
FIG. 4 is an operational flow chart illustrating various processes which can be performed for preferential selection of IP version in accordance with another embodiment of the technology disclosed herein.

FIG. 4 is an operational flow chart illustrating example processes that may be performed to achieve preferential IP version selection in accordance with another embodiment. As illustrated in FIG. 4, upon receiving a Quad-A DNS request, at operation 400, a determination is made whether the queried domain name matches a domain name in the domain bypass list. If no match in the domain bypass list is found, the DNS proxy server may access its cache at operation 402. It is determined whether a match exists at operation 404. If a match in the DNS proxy server cache exists, response is transmitted to the user device with a DNS answer record at operation 406. For example, and referring back to the www.facebook.com example, a response may be "www.facebook.com IN AAAA 2620:0:1cfe:face:b00c::3." If at operation 404, no match can be found, both a single-A and a quad-A DNS request can be forwarded to the appropriate DNS server.

If at operation 400, a match to a domain name entry in the domain bypass list is found, the configuration/rules applicable to that domain name entry are determined at operation 410. If it is determined that IPv6 traffic is to be blocked while IPv4 traffic is to be allowed, the DNS proxy server responds to the DNS request with an error message indicating that the DNS request has been refused at operation 412. For example, a DNS Response Code, RCODE=5, can be sent which indicates that the name server refuses to perform the specified operation for policy reasons. Additionally, at operation 414, the DNS proxy server can forward a Single-A DNS request for the same domain to the appropriate DNS server. That is, if DNS request from the local host is addressed to a DNS proxy server, then the DNS proxy server forwards the DNS request to the DNS Server that is preconfigured. If the DNS request from the local host is addressed to an external DNS server, the DNS proxy server forwards the DNS request to the specified external DNS Server.

If, at operation 410, the determined configuration instructs that IPv4 traffic is to be blocked, while IPv6 traffic is to be allowed, the DNS proxy server attempts to resolve the DNS request based on its DNS cache at operation 416. If there is a match within the DNS proxy server cache at operation 418, the CPE immediately returns a Quad-A DNS response message with the IPv6 DNS record at operation 420. If there is no match at operation 418, to ensure that the DNS proxy server cache is up-to-date, the DNS proxy server also forwards a Quad-A DNS request to the appropriate server (e.g., external DNS Server or DNS Server that is preconfigured) at operation 422.

In the event that the configuration determined at operation 410 by looking at the domain bypass list instructs that both IPv4 and IPv6 are to be blocked (e.g., in the event that it is known that the domain is associated with a virus, malware, or some other issue), an error message is sent at operation 424 indicating the DNS request has been refused. Again, a DNS response code, RCODE=5, can be sent which indicates that the name server refuses to perform the specified operation for policy reasons. Moreover, the DNS proxy server does not forward a Quad-A DNS request for that domain name. This ensures that the DNS proxy server resources are not consumed upon blocking a domain (e.g., to block virus-like activity on web sites).

In accordance with another embodiment, and similar to a DNS proxy server, a domain bypass list can be utilized by a web proxy server (such as a caching proxy, forwarding proxy, open proxy, etc.) to determine if the web proxy server should: allow IPv6 and block IPv4 traffic; allow IPv4 and block IPv6 traffic; or allow no traffic (i.e., block both IPv4 and IPv6 traffic). In this embodiment, a web proxy server may be embodied as a WAS, which can consult a domain bypass list to determine the socket (IPv4 or IPv6) that is used for fetching an Internet resource (such as HTTP objects). For example, if the domain bypass list indicates that IPv6 traffic has to be blocked for a particular website, e.g., www.irs.gov, then the web proxy server uses an IPv4 socket (connection) to fetch all the objects from www.irs.gov. Thus, and in the context of pre-fetching content, the WAS tries to find resources needed beforehand. By accessing a domain bypass list, the WAS is aware whether or not a webpage would fail to load using IPv4 or IPv6 addressing for subsequent requests, WAS knows not to use an IP version type that is known to have connectivity or performance issues.

It should be noted that in the case of a DNS proxy server in a VSAT or a web proxy server, such as a WAS at a satellite gateway, any information that is learned regarding IPv4/IPv6 access can be distributed to other network entities, such as other VSATs, and such learned information can be relevant to varying levels of the DNS name space, for example, at the root level (e.g., .com, .net, .edu) or some sublevel (e.g., fish.shimano.com, fish.shimano-eu.com). It is also contemplated that local/user-specific learned information on the VSAT level can be transmitted up to the NOC, where the NOC can distribute the learned IPv4/IPv6 information to other VSATs. Further still, the distribution of learned information can be performed, e.g., based on a user's history, where only learned information relevant to prior DNS requests made by a particular user are forwarded to that user (i.e., as needed). Learned data can stored anywhere (e.g., local to the VSAT, some other central server/data repository, etc.)

As described above with reference to FIGS. 3 and 4, a determination is made whether a DNS request results in a domain name match at the domain bypass list. In accordance with one embodiment, a proxy server may support a "first match" method, and in accordance with another embodiment, may support a "best match" method to "tail match" hostnames in the DNS request and the domain bypass list. For example, if a proxy server has an entry in a domain bypass list with ".goodguide.com" to block IPv4 and IPv6 traffic, the proxy server blocks "toolbar.goodguide.com", "test.toolbar.goodguide.com", "www.goodguide.com" and so on. This can be referred to as the best match method.

For the first match method, a sequential search may be performed, although this can potentially have an impact on performance. To reduce the performance impact, a proxy server may stop a search after determining the existence of a "first match." That is, if the proxy server operates by access a domain bypass list such as that of Table 1, and receives a DNS/HTTP request to "nfl.sports.nikeplus.com," a match to ".nikeplus.com" is determined, but not to ".sports.nikeplus.com." A simple tree structure may be used to support "best match" instead of "first match."

That is, and when domain bypass entries are organized as a simple unordered list, at every search evaluation point, no information as to whether there are other entries pertaining to the same domain hierarchy exists. For example, if a domain bypass list has both ".nikeplus.com" and ".sports.nikeplus.com" entries, and if a search encounters the entry ".nikeplus.com" it has no knowledge that ".sports.nikeplus.com" also exists in the list. As a result, the search will either have to terminate at ".nikeplus.com" or the search will have to potentially scan (and compare) every entry until reaching or hitting ".sports.nikeplus.com." In a a worst case scenario, ".sports.nikeplus.com," could be the last entry in the domain bypass list. The need to scan and compare unrelated entries before arriving at an optimal entry is therefore expensive, especially when the domain bypass list is searched for every DNS/HTTP request.

Thus, in contrast to a simple unordered list, a tree structure by its very nature, allows for the maintenance of information regarding whether there are other related entries. In the above example, the entry containing ".nikeplus.com" will contain a value of, e.g., "1" indicating there is one more related entry down in the hierarchy (i.e. ".sports.nikeplus.com"). Therefore, the decision to traverse down the sub-tree will be very efficient and targeted only towards related entries. This allows for the efficient implementation of both first match and best match evaluation criteria.

As alluded to previously, the domain bypass list can be manually created, updated, and/or maintained, or it can be dynamically created, updated, and/or maintained. To dynamically create, update, and/or maintain the domain bypass list, a proxy server can monitor the results of traffic to IP addresses returned for domain names and bypass a single IP address, or all IPv4 addresses or all IPv6 addresses if one or more of the following example signatures are noticed: 1) there is consistently no response to TCP SYN from an IP address; 2) out of profile traffic amounts to a given domain; 3) consistent failure of TCP connection to an IP address prior to establishment or data transfer; and/or 4) significantly bad performance of an application going to a particular domain using an IPv6 versus IPv4 IP address or vice versa. Accordingly, the proxy server learns what domains have potential issues and automatically populates the domain bypass list, along with the flags/information to indicate if a single IP address, or all IPv4 or all IPv6 addresses need to be blocked.

Figure 5:
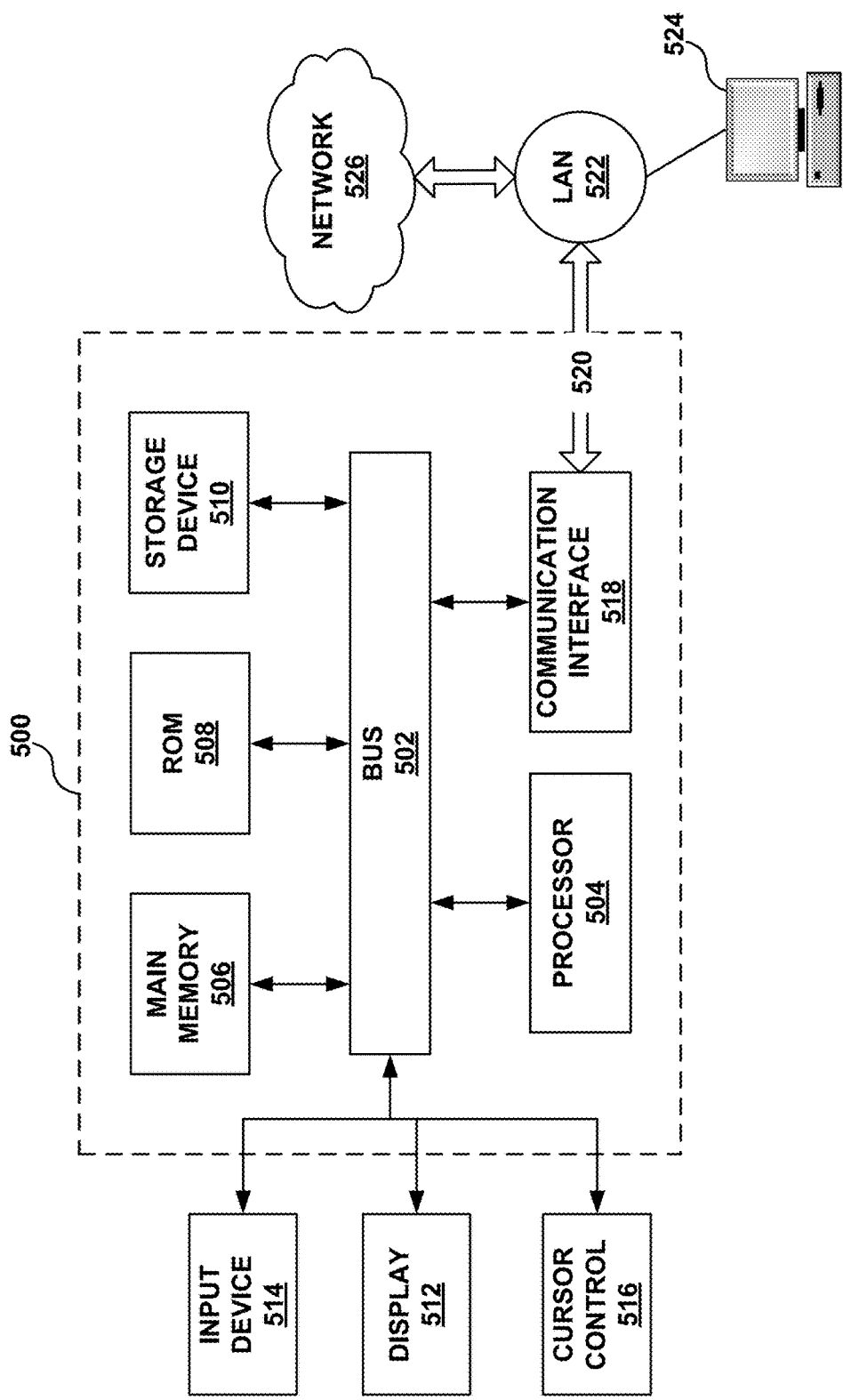
FIG. 5 illustrates a computer system upon which example embodiments according to the systems and methods disclosed herein can be implemented.

FIG. 5 illustrates a computer system 500 upon which example embodiments according to the present invention can be implemented. Computer system 500 can include a bus 502 or other communication mechanism for communicating information, and a processor 504 coupled to bus 502 for processing information. Computer system 500 may also include main memory 506, such as a random access memory (RAM) or other dynamic storage device, coupled to bus 502 for storing information and instructions to be executed by processor 504. Main memory 506 can also be used for storing temporary variables or other intermediate information during execution of instructions to be executed by processor 504. Computer system 500 may further include a read only memory (ROM) 508 or other static storage device coupled to bus 502 for storing static information and instructions for processor 504. A storage device 510, such as a magnetic disk or optical disk, may additionally be coupled to bus 502 for storing information and instructions.

Computer system 500 can be coupled via bus 502 to a display 512, such as a cathode ray tube (CRT), liquid crystal display (LCD), active matrix display, light emitting diode (LED)/organic LED (OLED) display, digital light processing (DLP) display, or plasma display, for displaying information to a computer user. An input device 514, such as a keyboard including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

According to various embodiments of the systems and methods disclosed herein, the functional modules described herein, such as, for example, proxy servers, IP gateways, end-user devices, web servers, and so on can be implemented using one or more computing systems to implement the functionality described herein as well as other functionality that may be performed by the various devices. Such functionality can be provided, in accordance with example embodiments, is by computer system 500 in response to processor 504 executing an arrangement of instructions contained in main memory 506. Such instructions can be read into main memory 506 from another computer-readable medium, such as storage device 510. Execution of the arrangement of instructions contained in main memory 506 causes processor 504 to perform one or more processes described herein. One or more processors in a multi-processing arrangement may also be employed to execute the instructions contained in main memory 506. In alternative embodiments, hard-wired circuitry is used in place of or in combination with software instructions to implement various embodiments. Thus, embodiments described in the present disclosure are not limited to any specific combination of hardware circuitry and software.

Computer system 500 may also include a communication interface 518 coupled to bus 502. Communication interface 518 can provide a two-way data communication coupling to a network link 520 connected to a local network 522. By way of example, communication interface 518 may be a digital subscriber line (DSL) card or modem, an integrated services digital network (ISDN) card, a cable modem, or a telephone modem to provide a data communication connection to a corresponding type of telephone line. As another example, communication interface 518 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 518 sends and receives electrical, electromagnetic, or optical signals that carry digital data streams representing various types of information. Further, communication interface 518 may include peripheral interface devices, such as a Universal Serial Bus (USB) interface, a PCMCIA (Personal Computer Memory Card International Association) interface, etc.

Network link 520 typically provides data communication through one or more networks to other data devices. By way of example, network link 520 can provide a connection through local network 522 to a host computer 524, which has connectivity to a network 526 (e.g. a wide area network (WAN) or the global packet data communication network now commonly referred to as the "Internet") or to data equipment operated by service provider. Local network 522 and network 526 may both use electrical, electromagnetic, or optical signals to convey information and instructions. The signals through the various networks and the signals on network link 520 and through communication interface 518, which communicate digital data with computer system 500, are example forms of carrier waves bearing the information and instructions.

Computer system 500 may send messages and receive data, including program code, through the network(s), network link 520, and communication interface 518. In the Internet example, a server (not shown) might transmit requested code belonging to an application program for implementing an embodiment of the present invention through network 526, local network 522 and communication interface 518. Processor 504 executes the transmitted code while being received and/or store the code in storage device 510, or other non-volatile storage for later execution. In this manner, computer system 500 obtains application code in the form of a carrier wave.

The term "computer-readable medium" as used herein refers to any medium that participates in providing instructions to processor 504 for execution. Such a medium may take many forms, including but not limited to non-volatile media, volatile media, and transmission media. Non-volatile media include, for example, optical or magnetic disks, such as storage device 510. Volatile media may include dynamic memory, such as main memory 506. Transmission media may include coaxial cables, copper wire and fiber optics, including the wires that comprise bus 502. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 6:
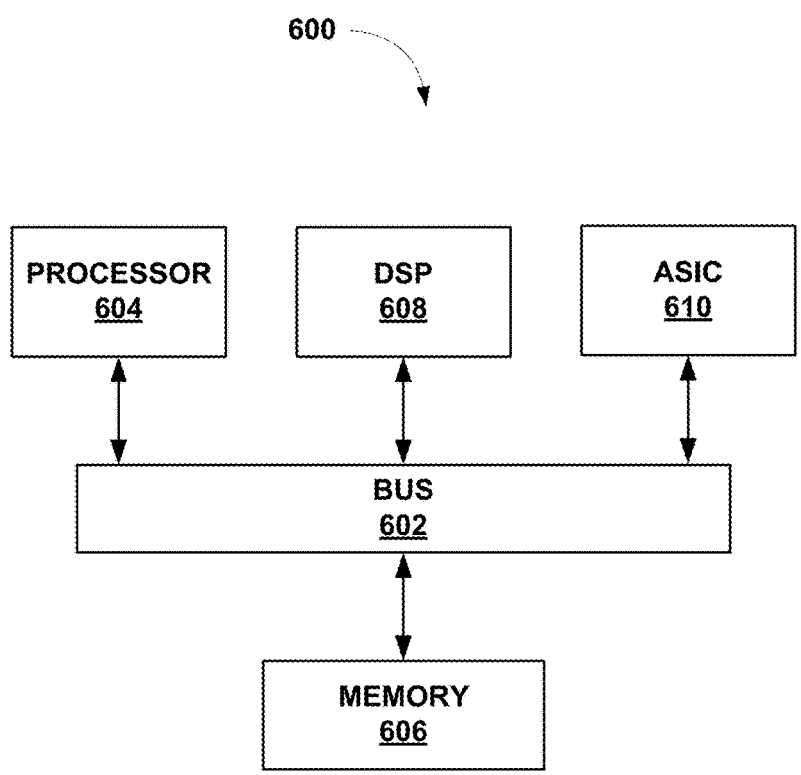
FIG. 6 illustrates a chip set in which embodiments of the systems and methods disclosed herein may be implemented.

FIG. 6 illustrates a chip set 600 in which embodiments of the invention may be implemented. Chip set 600 can include, for instance, processor and memory components described with respect to FIG. 6 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 600 includes a communication mechanism such as a bus 602 for passing information among the components of the chip set 600. A processor 604 has connectivity to bus 602 to execute instructions and process information stored in a memory 606. Processor 604 includes one or more processing cores with each core configured to perform independently. A multi-core processor enables multiprocessing within a single physical package. Examples of a multi-core processor include two, four, eight, or greater numbers of processing cores. Alternatively or in addition, processor 604 includes one or more microprocessors configured in tandem via bus 602 to enable independent execution of instructions, pipelining, and multithreading.

Processor 604 may also be accompanied with one or more specialized components to perform certain processing functions and tasks such as one or more digital signal processors (DSP) 608, and/or one or more application-specific integrated circuits (ASIC) 610. DSP 608 can typically be configured to process real-world signals (e.g., sound) in real time independently of processor 604. Similarly, ASIC 610 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 604 and accompanying components have connectivity to the memory 606 via bus 602. Memory 606 includes both dynamic memory (e.g., RAM) and static memory (e.g., ROM) for storing executable instructions that, when executed by processor 604, DSP 608, and/or ASIC 610, perform the process of example embodiments as described herein. Memory 606 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising;
a proxy server receiving a domain name service (DNS) request for a domain; the proxy server determining whether the domain matches an entry stored within a domain bypass list, the domain list comprising a list of preferred Internet Protocol (IP) version to domain name mappings;
upon a determination that the domain does not match at least one entry stored within the domain bypass list, looking up the domain in a cache of the proxy server; and
upon a determination that the domain does match at least one entry stored within the domain bypass list, determining whether to allow or block one or more types of traffic based upon a preferentially selected IP version, the preferentially selected IP version comprising at least one of an IPv4 address and an IPv6 address.

2. The method of claim 1, wherein the proxy server comprises a DNS proxy server implemented within a very small aperture terminal (VSAT) of a broadband satellite network.

3. The method of claim 1, wherein the proxy server comprises a web acceleration server implemented within a gateway of a broadband satellite network.

4. The method of claim 1, further comprising, upon looking up the domain in the cache of the proxy server, responding to a requesting device with a DNS answer record if the domain is found in the cache of the proxy server.

5. The method of claim 4, wherein the DNS answer record comprises a single-A DNS record if the DNS request is a single-A DNS request.

6. The method of claim 4, wherein the DNS answer record comprises a quad-A DNS record if the DNS request is a quad-A DNS request.

7. The method of claim 1, further comprising, upon looking up the domain in the cache of the proxy server, forwarding a single-A and a quad-A DNS request to one of a subsequent DNS server or DNS server list if the domain is not found in the cache of the proxy server.

8. The method of claim 1, wherein determining whether to allow or block one or more types of traffic based upon a preferentially selected Internet Protocol (IP) version further comprises one of blocking 1 Pv4 traffic while allowing IPv6 traffic, allowing IPv4 traffic while blocking IPv6 traffic, or blocking both IPv4 and IPv6 traffic.

9. The method of claim 8, further comprising, upon determining to block IPv4 traffic while allowing IPv6 traffic, sending an error message to a requesting device if the DNS request is a single-A DNS request, and forwarding a quad-A DNS request to one of a subsequent DNS server or a DNS server list.

10. The method of claim 8, further comprising, upon determining to allow IPv4 traffic while blocking IPv6 traffic, looking up the domain in a cache of the proxy server if the DNS request is a single-A DNS request, and determining if the domain matches an entry in the cache of the proxy server.

11. The method of claim 10, further comprising, upon a determination that the domain matches an entry in the cache of the proxy server, responding to a requesting device with a Single-A DNS answer record.

12. The method of claim 10, further comprising, upon a determination that the domain does not match an entry in the cache of the proxy server, forwarding a single-A DNS request to one of a subsequent DNS server or a DNS server list.

13. The method of claim 8, further comprising, upon determining to block both IPv4 traffic and IPv6 traffic, sending an error message to a requesting device.

14. The method of claim 8, further comprising, upon determining to block IPv4 traffic while allowing IPv6 traffic, looking up the domain in a cache of the proxy server if the DNS request is a quad-A DNS request, and determining if the domain matches an entry in the cache of the proxy server.

15. The method of claim 14, further comprising, upon a determination that the domain matches an entry in the cache of the proxy server, responding to a requesting device with a quad-A DNS answer record.

16. The method of claim 14, further comprising, upon a determination that the domain does not match an entry in the cache of the proxy server, forwarding a quad-A DNS request to one of a subsequent DNS server or a DNS server list.

17. The method of claim 8, further comprising, upon determining to allow IPv4 traffic while blocking IPv6 traffic, sending an error message to a requesting device if the DNS request is a quad-A DNS request, and forwarding a single-A DNS request to one of a subsequent DNS server or a DNS server list.

18. The method of claim 1, wherein determining whether the domain matches an entry stored within a domain bypass list comprises one of finding a first entry and ending the determination or finding any entry having a matching domain.

19. The method of claim 1, wherein the domain bypass list is at least one of created, updated, and maintained dynamically and automatically based on monitoring of the one or more types of traffic.

20. A very small aperture terminal (VSAT) of a satellite network, comprising:
a domain name service (DNS) proxy server for receiving a DNS request for a domain from a requesting device;
a DNS proxy server cache, wherein the DNS proxy server determines whether the domain matches an entry stored within a domain bypass list, the domain list comprising a list of preferred Internet Protocol (IP) version to domain name mappings;
at least one processor; and
at least one memory unit storing program instructions adapted to cause the at least processor to:
upon a determination that the domain does not match at least one entry stored within the domain bypass list, look up the domain in the DNS proxy server cache; and
upon a determination that the domain does match at least one entry stored within the domain bypass list, determine whether to allow or block one or more types of traffic based upon a preferentially selected IP version, the preferentially selected IP version comprising at least one of an IPv4 address and an IPv6 address.

21. The VSAT of claim 20, wherein the preferentially selected IP version comprises one of IPv4 or IPv6.

22. The VSAT of claim 21, wherein determining whether to allow or block one or more types of traffic comprises one of blocking IPv4 traffic while allowing IPv6 traffic, allowing IPv4 traffic while blocking IPv6 traffic, or blocking both IPv4 and IPv6 traffic.

23. A satellite gateway, comprising:
a web acceleration server for receiving a request from a requesting device;
a cache, wherein the web acceleration server determines whether a domain matches an entry stored within a domain bypass list in relation to the request, the domain list comprising a list of preferred Internet Protocol (IP) version to domain name mappings;
at least one processor; and
at least one memory unit storing program instructions adapted to cause the at least processor to:
upon a determination that the domain does not match at least one entry stored within the domain bypass list, look up the domain in the cache; and
upon a determination that the domain does match at least one entry stored within the domain bypass list, determine whether to allow or block one or more types of traffic based upon a preferentially selected IP version, the preferentially selected IP version comprising at least one of an IPv4 address and an IPv6 address.

24. The satellite gateway of claim 23, wherein the preferentially selected IP version comprises one of IPv4 or IPv6.

25. The satellite gateway of claim 24, wherein determining whether to allow or block one or more types of traffic comprises one of blocking IPv4 traffic while allowing IPv6 traffic, allowing IPv4 traffic while blocking IPv6 traffic, or blocking both IPv4 and IPv6 traffic.

* * * * *